(12) United States Patent
Kiuchi et al.

(10) Patent No.: US 6,380,650 B1
(45) Date of Patent: Apr. 30, 2002

(54) ELECTRIC MOTOR INSTALLATION STRUCTURE

(75) Inventors: Keiji Kiuchi, Nittagun; Shinichi Hagiwara, Isesaki; Takashi Sekiguchi, Takasaki; Yusuke Fujita, Ota; Ken Yamamoto, Kiryu, all of (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/356,448

(22) Filed: Jul. 19, 1999

(30) Foreign Application Priority Data

Jul. 22, 1998 (JP) .......... 10-206426
May 19, 1999 (JP) .......... 11-138016

(51) Int. Cl.⁷ .............. H02K 5/00; H02K 5/24
(52) U.S. Cl. ............... 310/89; 310/89; 310/42
(58) Field of Search .......... 310/89, 91, 42, 310/51, 58, 59; 29/596–598

(56) References Cited

U.S. PATENT DOCUMENTS 4,181,472 A * 1/1980 Sharp .................. 417/363
4,233,531 A * 11/1980 Nakano et al. .......... 310/42
5,850,115 A * 12/1998 Grosskopf ............. 310/67 R
5,883,451 A * 3/1999 Majchrzak et al. ....... 310/89
5,914,550 A * 6/1999 Periyathamby et al. ... 310/91
5,969,447 A * 10/1999 Periyathamby et al. ... 310/89

FOREIGN PATENT DOCUMENTS

JP       06-189498       * 7/1994   ............ 310/51

* cited by examiner

Primary Examiner—Tran Nguyen
(74) Attorney, Agent, or Firm—Oliff & Berridge, PLC

(57) ABSTRACT

An installation structure allows easy installation of vibration-proofing members in an electric motor, which avoid resonance due to vibration of an engine, without increasing the number of components. A bottom wall of an installation hole for receiving the electric motor is spaced from a bottom wall of a yoke. Also, flexible tabs are formed on the bottom wall of the yoke. In this arrangement, the electric motor is installed in the installation hole in a manner such that the flexible tabs are pressed into contact with a step portion arranged on the bottom wall of the installation hole.

16 Claims, 8 Drawing Sheets

ELECTRIC MOTOR INSTALLATION STRUCTURE

BACKGROUND OF THE INVENTION

1. Field of Invention

The invention relates to an installation structure for an electric motor to be installed in a motor vehicle.

2. Description of Related Art

Recent motor vehicles employ electric motors of various types. These electric motors include those employed, for example, as actuators for electronically controlling throttle valves that regulate the amount of air to be drawn into an engine of the motor vehicle. The electric motor is installed in a throttle chamber assembly.

The electric motor is inserted in a cylinder-shaped installation hole formed in a throttle body of the throttle chamber assembly, and is fixed at the opening end of the installation hole with fastenings such as bolts. As the electric motor is supported only at one end, the electric motor will resonate due to vibrations of components such as an engine when the electric motor is used in the vicinity of the components that vigorously vibrate.

The electric motor, used for regulation of the amount of air drawn in, is required to perform control operations with high precision. Therefore, resonance due to the vibrating components such as the engine must be avoided or minimized. To achieve this, as shown in FIG. 8, an electric motor M for operating a throttle valve 10 is installed between a deeply grooved section 12a and a projected section 13a via vibration-proofing members such as an O-ring 14 and a spring. The deeply grooved section 12a is formed indented on a bottom wall 12 of an installation hole 11, and the projected section 13a is formed on the end wall of a casing 13.

In the structure described above, however, the vibration-proofing members, such as the O-ring 14 and the spring, are necessary to support the motor at the second end. This gives rise to a problem in that the number of components increases.

In addition, in the structure described above, the electric motor must be installed by accurately positioning the vibration-proofing members in the bottom wall of the installation hole. When the casing or yoke of the electric motor is inserted in the installation hole, however, the vibration-proofing members are not visible; that is, the installed status of the vibration-proofing members cannot be visually verified. This reduces efficiency and reliability in production. These are problems that must be resolved.

SUMMARY OF THE INVENTION

To overcome the problems described above, an object of the invention is to provide an electric motor installation structure, in which a motor yoke is inserted in a cylinder-shaped installation hole, the motor yoke having one open end and one closed end, formed as a cylinder, and installed in the installation hole by fastening on the side of the open end of the motor yoke. An end wall of the motor yoke is spaced from the bottom wall of the installation hole, and flexible tabs are formed to protrude from the end wall of the motor yoke so as to be pressed into contact with the bottom wall. The flexible tabs serve as vibration-proofing members that minimize the effects of resonance due to vibration of the engine. This eliminates the need for vibrationproofing members, such as an O-ring and a spring, substantially reducing the number of components. Furthermore, the use of the tabs eliminates the assembly of the vibration-proofing members, which must be performed by accurately positioning the vibration-proofing members in the bottom wall of the installation hole, thereby improving processing efficiency.

The flexible tabs protruding from the end wall of the motor yoke are formed so as to extend in the axis-rotation direction of the motor casing. This type of formation allows long flexible tabs to be formed even when the diameter of the motor yoke is small, thus increasing reliability.

DETAILED DESCRIPTION OF PREFERRED EMBODIMENTS

Figure 1:
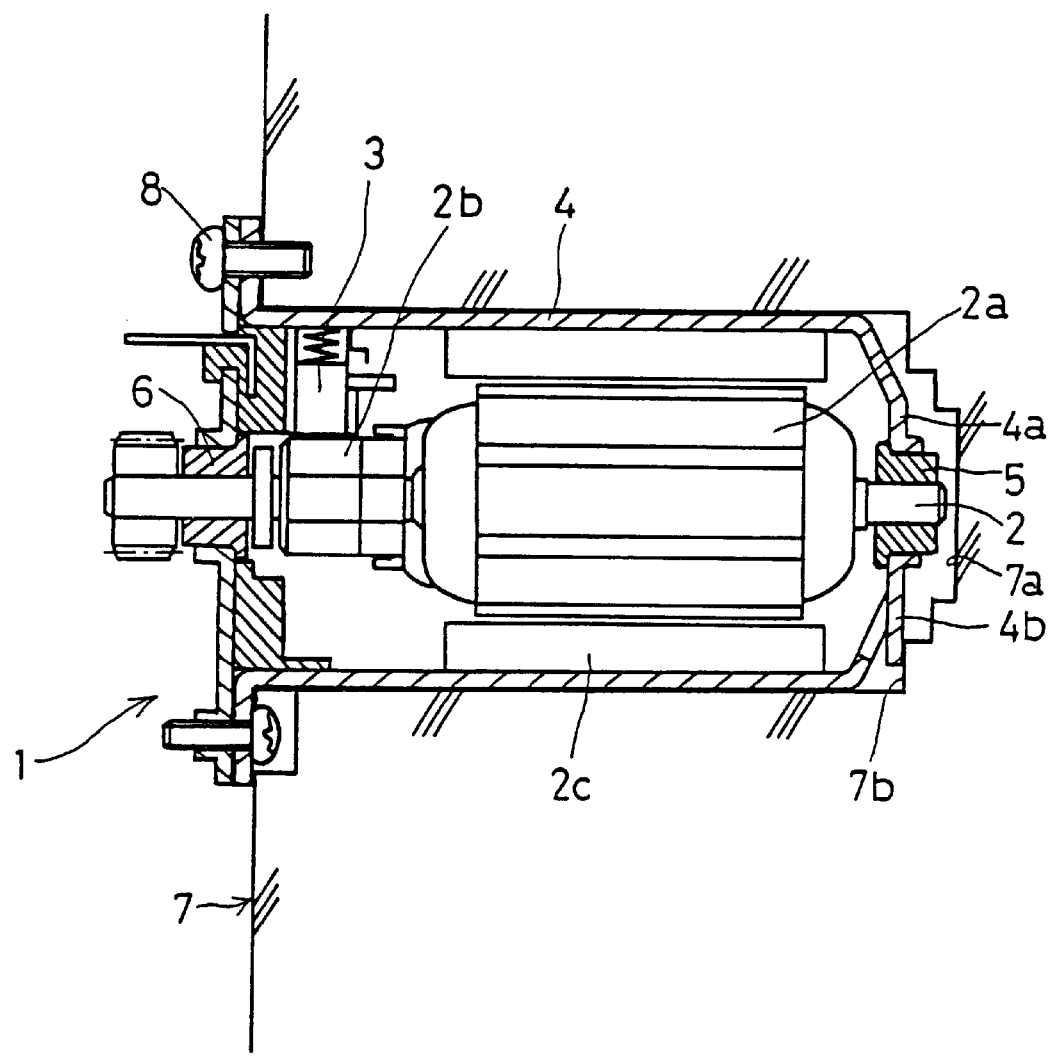
FIG. 1 is a cross-sectional view of the first embodiment of an installation structure of an electric motor.
Figure 2:
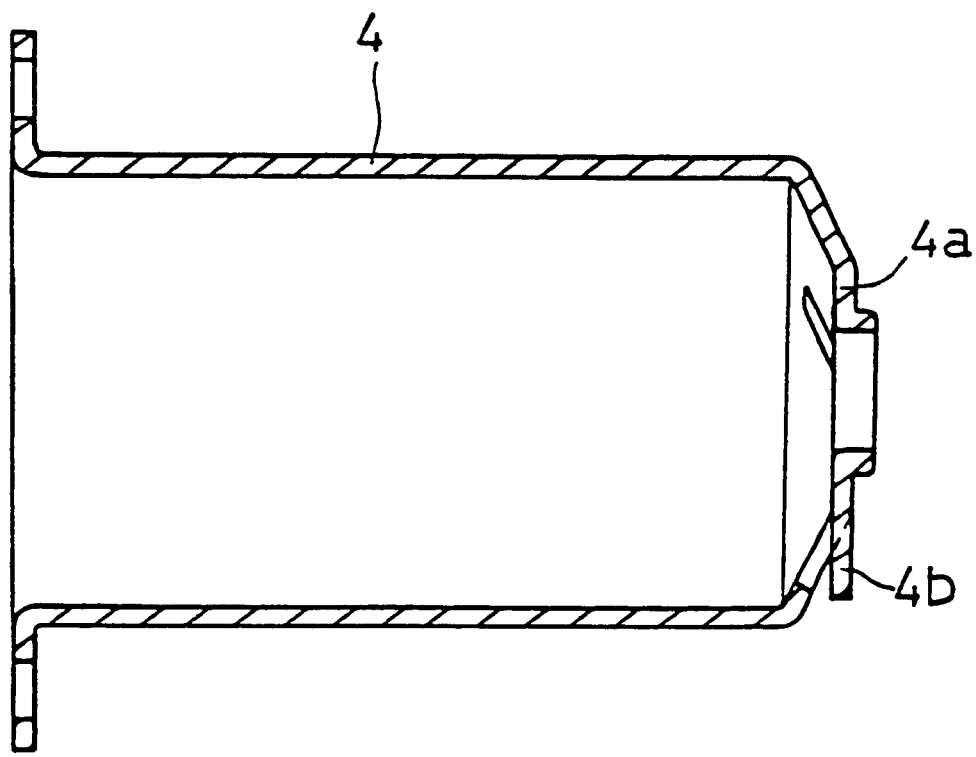
FIG. 2 is a cross-sectional view of a yoke.
Figure 3:
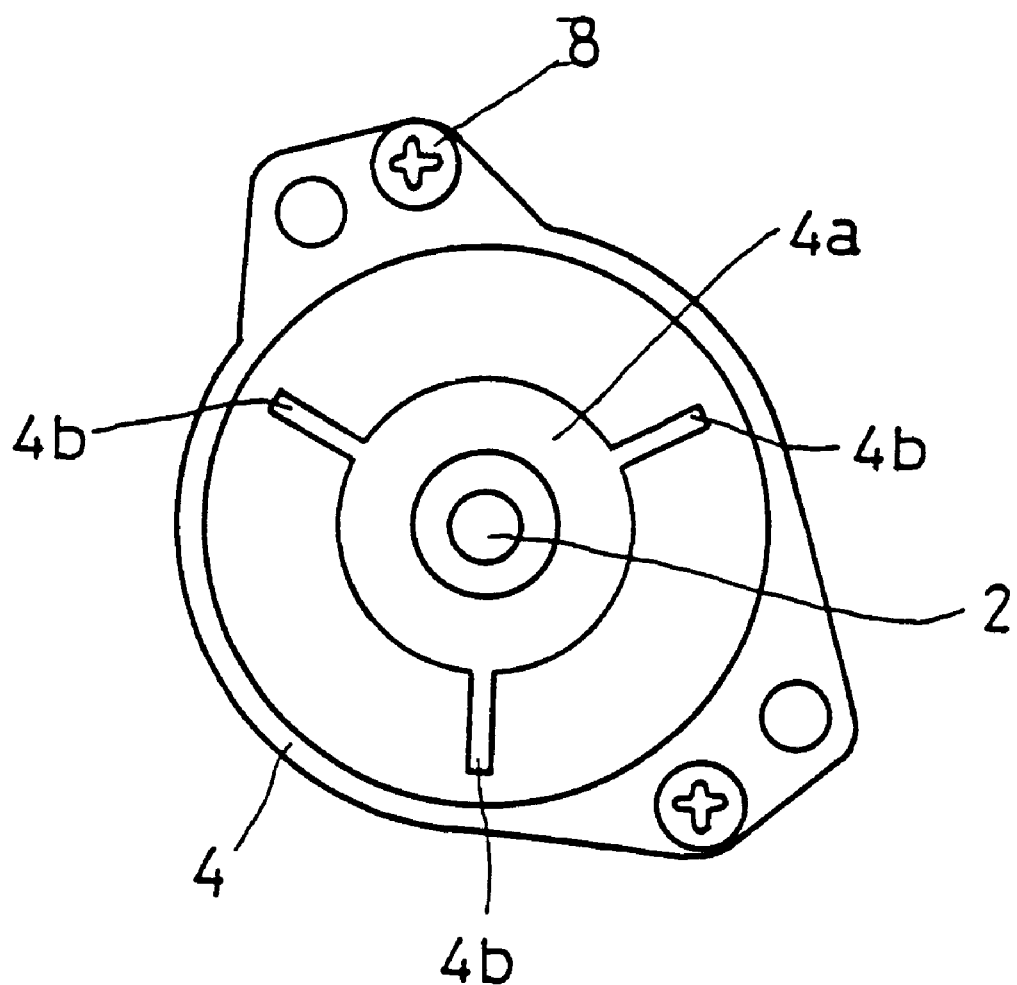
FIG. 3 is a bottom view of the yoke of the first embodiment.

Referring to FIGS. 1 to 3, a first embodiment of the invention is described.

An electric motor 1 is used as an actuator that electronically controls throttle valves for regulating the amount of air to be drawn into an engine. The electric motor 1 is composed of an armature shaft 2, an armature core 2a, a commutator 2b, a brush 3, a motor casing or yoke 4, and a permanent magnet 2c. The armature core 2a and the commutator 2b are integrally received by the armature shaft 2. The yoke 4 houses these components, and the permanent magnet 2c is immobilized onto an inner peripheral surface of the yoke 4.

The yoke 4 is shaped as a cylinder, of which one end is open and one end is closed. A bearing 6 is provided in a front bracket immobilized in the opening of the yoke 4, and a bearing 5 is provided in an end or bottom wall 4a of the yoke 4. The armature shaft 2 of the armature core 2a is journaled rotatably by the bearings 5 and 6. Also, three flexible tabs 4b are formed at an angular pitch of 120° in the axis-rotation direction, and are cut and protrude in a manner such that the axial side continues from the bottom wall of the yoke 4 and extends outward from the axis in the radial direction.

An installation hole is formed on a casing 7 of a throttle valve assembly. The installation hole of the casing 7 is designed to have dimensions which allow the yoke 4 to be inserted so as to be flexible, and the yoke 4 inserted in the installation hole of the casing 7 is fixed with a bolt 8 at a portion on the opening of the installation hole of the casing 7. Prior to fixing with the bolt 8, individual end sections of the flexible tabs 4b contact a step 7b formed on a bottom wall 7a of the installation hole of the casing 7. As the fixing with the bolt 8 proceeds, the flexible tabs 4b are pressed to cause elastic deformation while the bottom wall 4a of the yoke 4 is kept separated from the bottom wall 7a of the installation hole of the casing 7. The fixing is carried out in a configuration such as that described above.

In the installation structure described above, an alternative arrangement may be such that the flexible tabs 4b are pressed so as to cause plastic deformation, and the electric motor is supported by use of a spring-back function occurring thereby.

In the installation structure described above, the opening side of the yoke 4 housing the electric motor 1 is fixed at one end with the bolt 8 into the installation hole of the casing 7. However, the side of the bottom wall 4a of the yoke 4 is stably supported in the installation hole of the casing 7 by the springing-back due to the elastic deformation or plastic deformation of the flexible tabs 4b, which are formed on the bottom wall 4a of the yoke 4, the deformation being caused when the flexible tabs 4b are pressed by a portion of the step 7b of the bottom wall 7a of the installation hole of the casing 7. Thus, even when an engine vigorously vibrates, since the flexible tabs 4b serve as supporting members, support at only one portion is substantially avoided and the electric motor is supported at both ends. In addition, since the springing-back of the flexible tabs 4b serves as elastic vibration-proof members, resonance of the yoke 4 can be avoided. Therefore, the invention does not require vibration-proofing members, such as an O-ring and a spring, thereby reducing the number of components.

Also, in this embodiment, since installation of the electric motor 1 in the installation hole of the casing 7 can be performed by fixing with the bolt 8 in a manner such that the flexible tabs 4b are pressed to a portion of the step 7b formed in the bottom wall of the installation hole of the casing 7, procedures such as a high-precision machining of the installation hole, and precise positioning of the O-ring and vibration-proofing members in the installation hole, are avoided. Therefore, cost reduction can be achieved, and furthermore, work efficiency can be improved, and reliability can be increased.

An air window formed in the yoke 4 as a result of the flexible tabs 4b, allows heat in the electric motor to be removed. This is an advantage of the yoke 4 of the electric motor.

Figure 4:
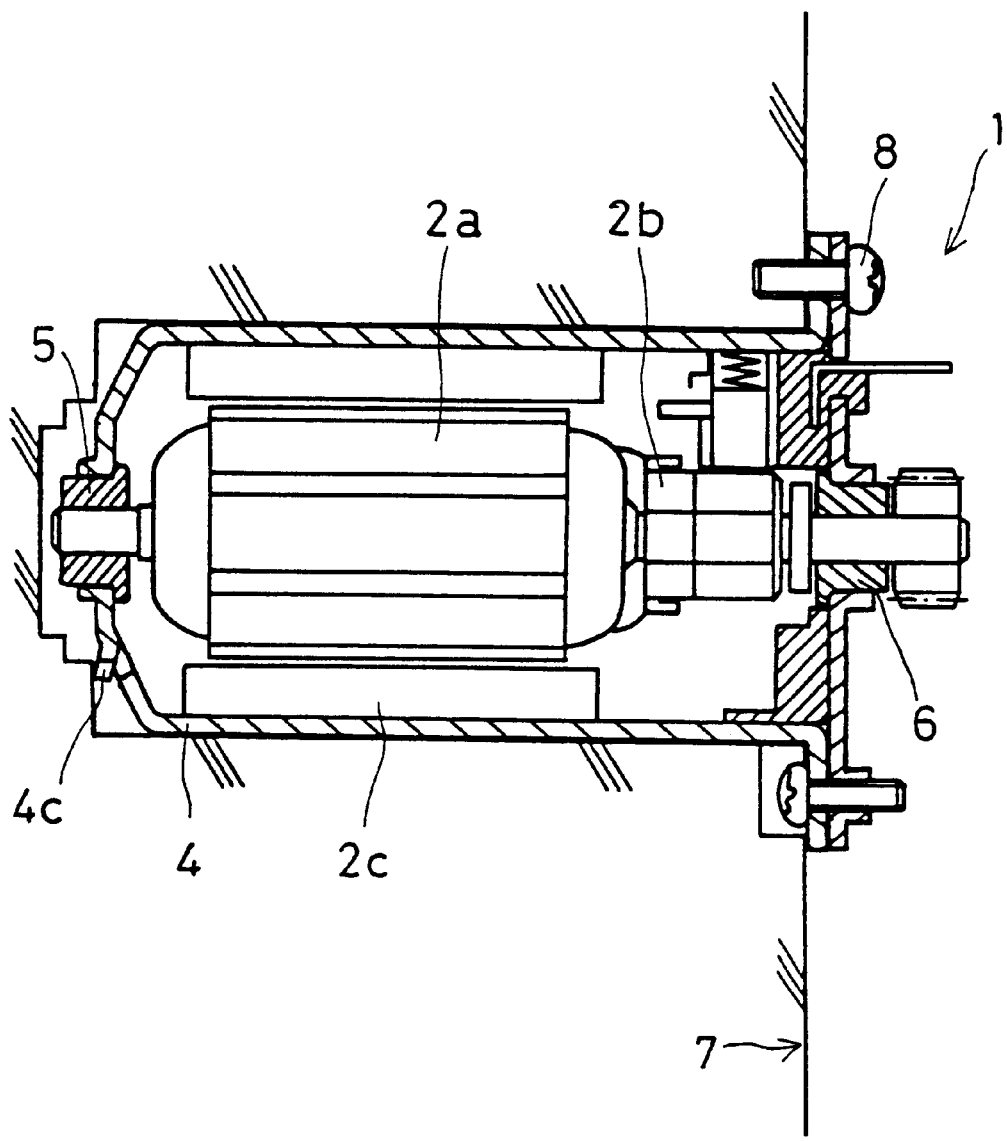
FIG. 4 is a cross-sectional view of a second embodiment of an installation structure of an electric motor.
Figure 5:
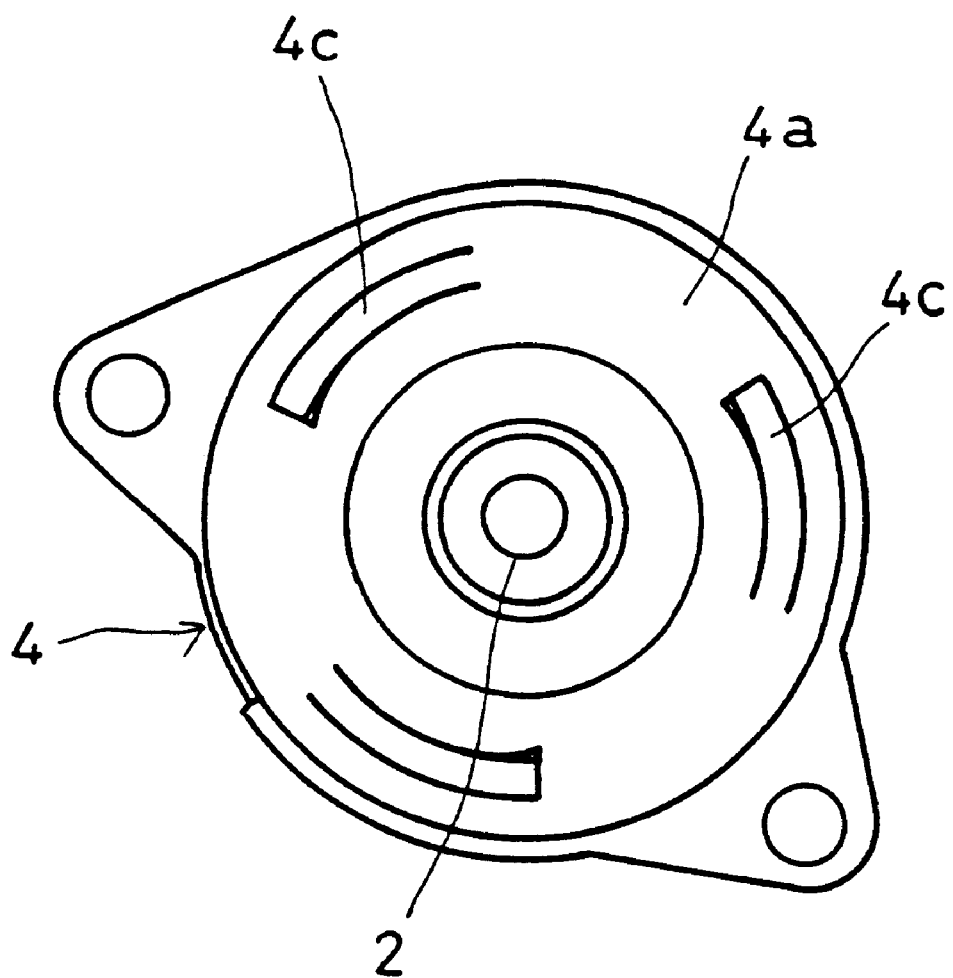
FIG. 5 is a cross-sectional view of a yoke of the second embodiment.

Referring to FIGS. 4 and 5, a second embodiment of the invention is described. The items shown in these figures with the same reference symbols as those in the first embodiment refer to items which are substantially identical. Therefore, these items are not described in detail.

Flexible tabs 4c to be formed on a bottom wall 4a of a yoke 4 are cut and protrude in an arc shape along the axis-rotation direction of the yoke 4, while being biased toward a periphery of the yoke 4. This is an effective formation when the diameter of the yoke 4 is small and required lengths of the tabs protruding in the radial direction cannot be formed. This formation is particularly effective as described below.

The yoke 4 may be formed of a strong magnetic material such as a ferrous material, and the casing 7 of the throttle valve assembly may be made of an aluminum material; that is, different materials may be used. A difference in thermal expansion of the yoke 4 and the casing 7 is caused due to variation in the ambient temperature. When the difference in the thermal expansion is caused, if the flexible tabs are too short, the flexible tabs may not press against the casing 7, or on the contrary, if the flexible tabs are too long, they may press against the casing 7 so that they are deformed, or in the worst case, broken. However, forming of the flexible tabs 4c in the axis-rotation direction allows flexible tabs 4c of a sufficient length to be formed even on a small-diameter yoke, thus increasing the reliability of the installation structure.

Figure 6:
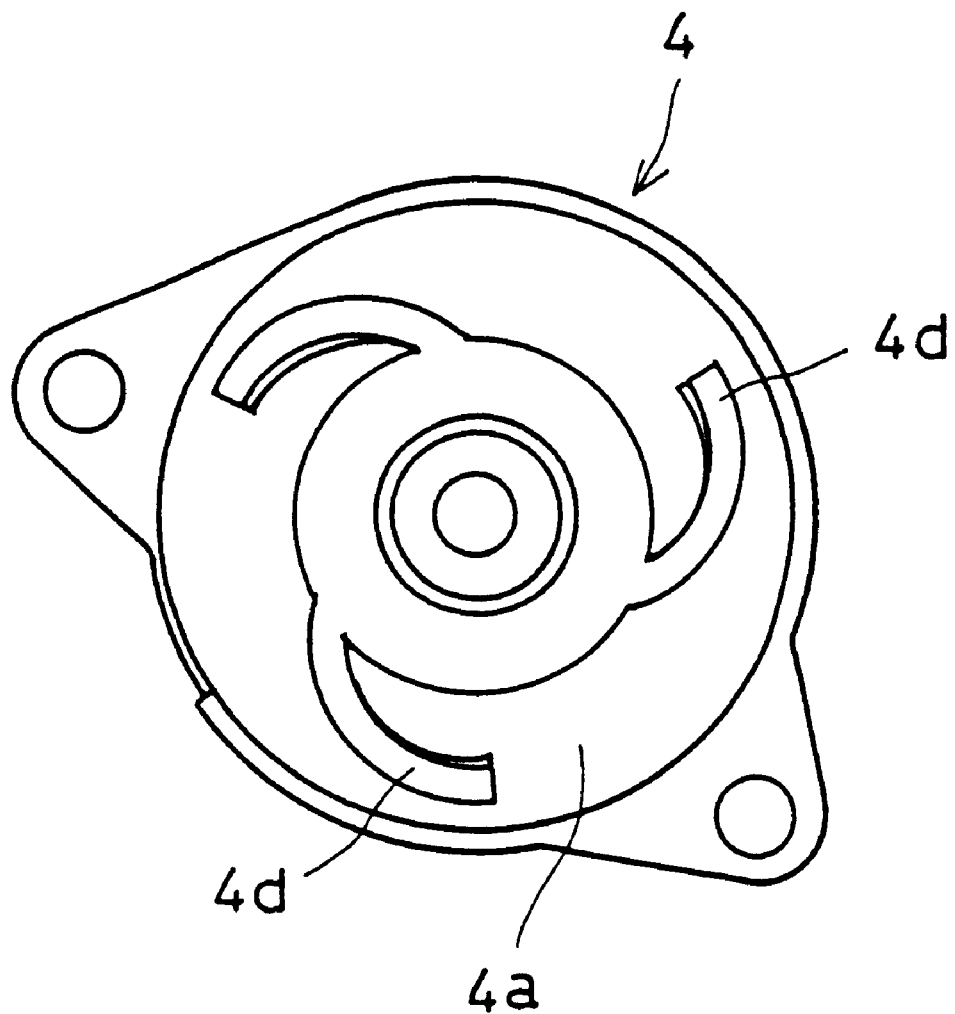
FIG. 6 is a bottom plan view of a yoke of a third embodiment.

To form the flexible tabs of sufficient length in the axis-rotation direction, as a third embodiment shown in FIG. 6, the tabs can be formed in a spiral shape. This allows longer flexible tabs 4d to be formed even when the diameter of the yoke 4 is small.

Figure 7:
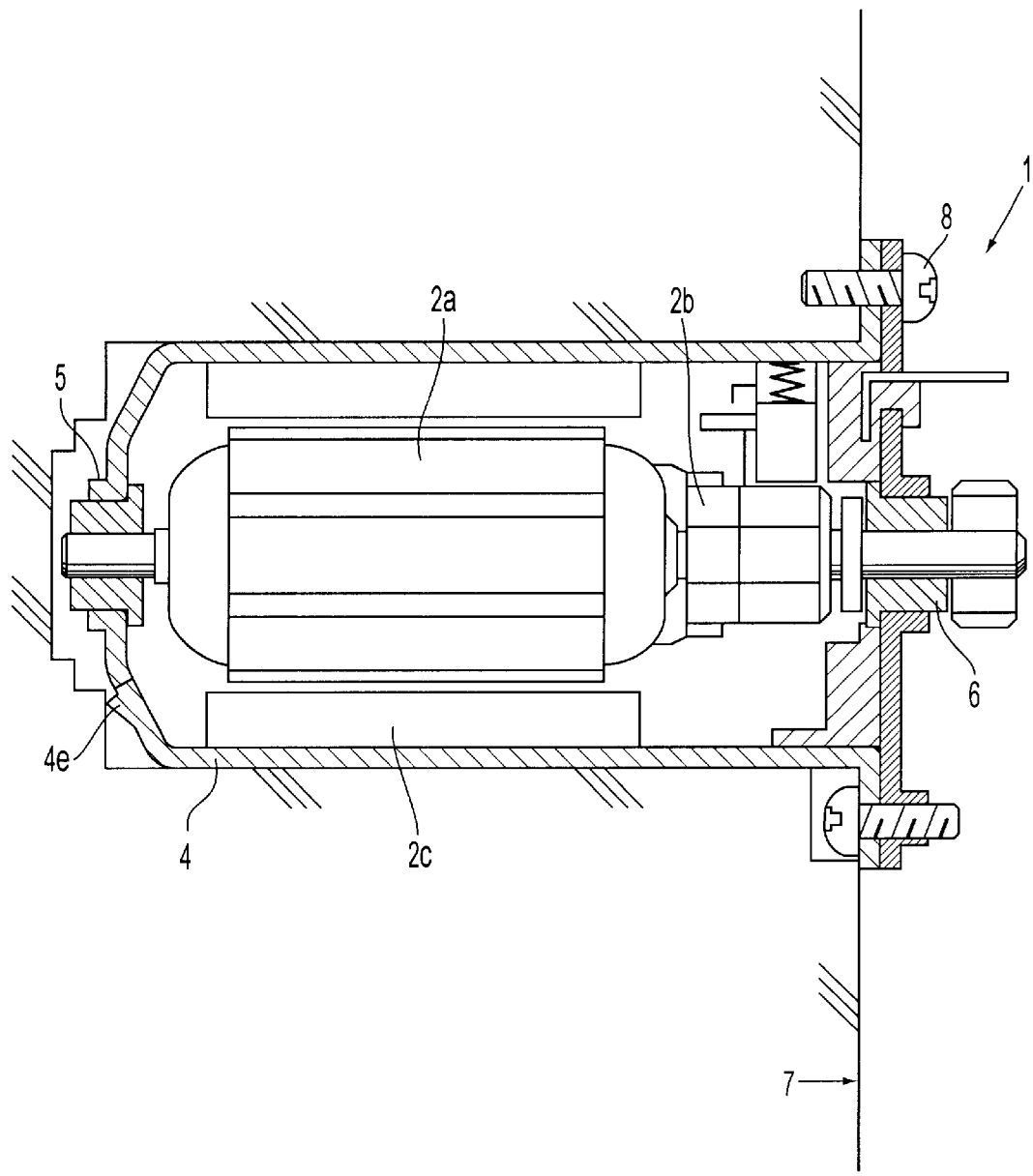
FIG. 7 is a cross-sectional view of another embodiment of an installation structure of an electric motor.
Figure 8:
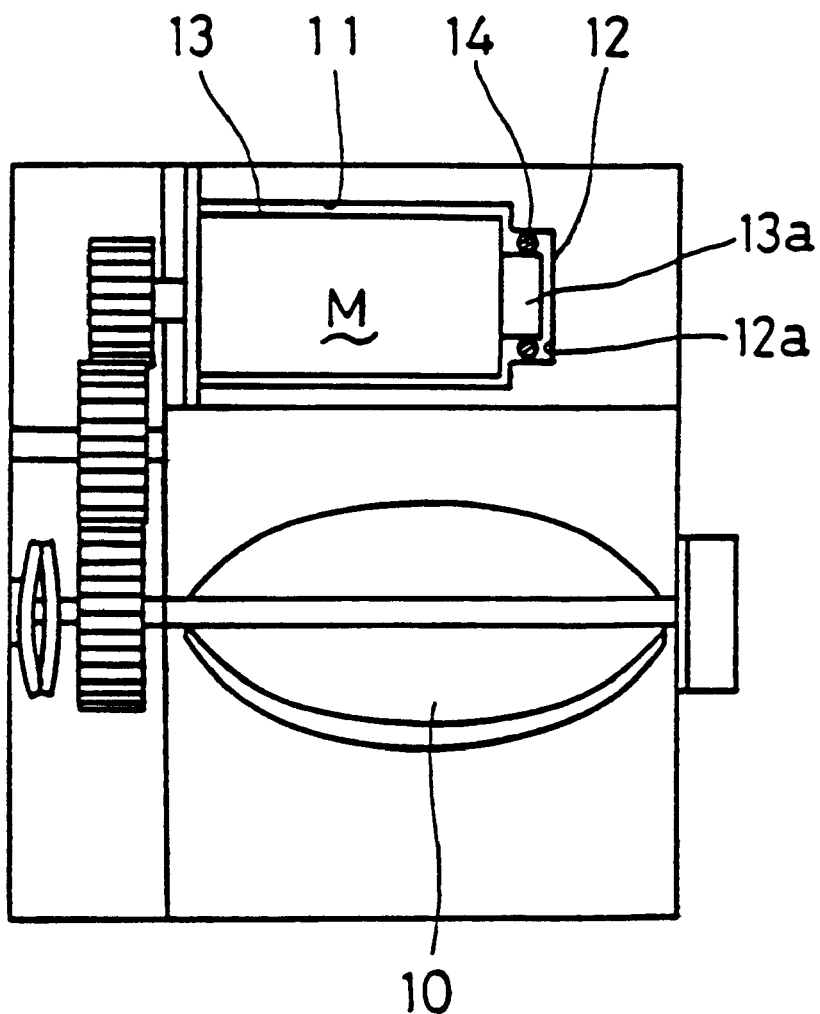
FIG. 8 is a schematic view of an installation of an electric motor via vibration-proofing members such as an O-ring and a spring.

The invention is not limited to the above-described embodiments. Flexible tabs 4e can be formed by cutting and protruding not on an outer radial side, as indicated in the first embodiment, but on an inner radial side, as shown in FIG. 7.

While this invention has been described in conjunction with the exemplary embodiments outlined above, it is evident that many alternatives, modifications, and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An electric motor installation structure, comprising: a motor casing inserted in a cylinder-shaped installation hole, the motor casing having one open end and one closed end and installed in the installation hole by fastening on the side of the open end of the installation hole, wherein an end wall of the motor casing which opposes a bottom wall of the installation hole is spaced from the bottom wall of the installation hole, and
  a plurality of flexible vibration-dampening tabs formed to protrude from the end wall of the motor casing so as to be pressed into contact with the bottom wall.

2. An electric motor installation structure according to claim 1, wherein the flexible tabs on the end wall of the motor casing extend along an axis-rotation direction of the motor casing.

3. An electric motor installation structure according to claim 2, wherein the flexible tabs extend in an arc shape in the axis-rotation direction.

4. An electric motor installation structure according to claim 2, wherein the flexible tabs extend in a spiral shape in the axis-rotation direction.

5. An electric motor installation structure according to claim 1, wherein the flexible tabs are elastically deformed by contact with the bottom wall.

6. An electric motor installation structure according to claim 1, wherein the flexible tabs are plastically deformed by contact with the bottom wall.

7. A motor, comprising:
  a motor casing having an outer peripheral surface having an open end and a closed end defining an end wall; and
  a plurality of flexible vibration-damping tabs cut from the end wall to protrude such that an axial side continues from the end wall of the motor casing and extends outward in a radial direction.

8. The motor according to claim 7, wherein the flexible tabs extend along in an axis-rotation direction of the casing.

9. The motor according to claim 8, wherein the flexible tabs extend in an arc shape in the axis-rotation direction.

10. The motor according to claim 8, wherein the flexible tabs extend in a spiral shape in the axis-rotation direction.

11. The motor according to claim 7, wherein the outer peripheral surface is cylindrical.

12. A motor casing for a motor, comprising:
  an outer peripheral surface having an open end and a closed end, the closed end defining an end wall; and
  a plurality of flexible vibrating-damping tabs cut from the end wall to protrude such that an axial side continues from an end wall of the motor casing and extends outward in a radial direction.

13. The casing according to claim 12, wherein the flexible tabs extend along in an axis-rotation direction of the casing.

14. The casing according to claim 13, wherein the flexible tabs extend in an arc shape in the axis-rotation direction.

15. The casing according to claim 13, wherein the flexible tabs extend in a spiral shape in the axis-rotation direction.

16. The casing according to claim 12, wherein the outer peripheral surface is cylindrical.

* * * * *